United States Patent
Tang et al.

(10) Patent No.: US 12,506,205 B2
(45) Date of Patent: Dec. 23, 2025

(54) BATTERY, METHOD FOR MANUFACTURING BATTERY, APPARATUS OF MANUFACTURING BATTERY AND ELECTRICITY-CONSUMING DEVICE

(71) Applicant: CONTEMPORARY AMPEREX TECHNOLOGY (HONG KONG) LIMITED, Hong Kong (CN)

(72) Inventors: Yu Tang, Ningde (CN); Xiayi Wu, Ningde (CN); Zeliang Yang, Ningde (CN); Zhenhua Li, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 600 days.

(21) Appl. No.: 18/048,449

(22) Filed: Oct. 21, 2022

(65) Prior Publication Data
US 2023/0170567 A1 Jun. 1, 2023

Related U.S. Application Data

(63) Continuation of application No. PCT/CN2021/134600, filed on Nov. 30, 2021.

(51) Int. Cl.
*H01M 50/204* (2021.01)
*H01M 10/04* (2006.01)
(Continued)

(52) U.S. Cl.
CPC ..... *H01M 50/204* (2021.01); *H01M 10/0413* (2013.01); *H01M 10/0431* (2013.01);
(Continued)

(58) Field of Classification Search
CPC ............. H01M 50/242; H01M 50/325; H01M 2200/20; H01M 10/0468; H01M 10/0481;
(Continued)

(56) References Cited

U.S. PATENT DOCUMENTS

| | | | |
|---|---|---|---|
| 2010/0143785 A1 | 6/2010 | Kwag et al. | |
| 2020/0058912 A1* | 2/2020 | Kuramitsu | H01M 50/209 |
| 2023/0040116 A1* | 2/2023 | Ushijima | H01M 50/291 |

FOREIGN PATENT DOCUMENTS

| | | |
|---|---|---|
| CN | 101609902 A | 12/2009 |
| CN | 106450406 A | 2/2017 |

(Continued)

OTHER PUBLICATIONS

Request for the Submission of an Opinion received in the counterpart Korean application 10-2022-7029264, mailed on Aug. 20, 2024.

(Continued)

*Primary Examiner* — Jessie Walls-Murray
(74) *Attorney, Agent, or Firm* — K&L Gates LLP

(57) ABSTRACT

Various embodiments provide a battery and a method for manufacturing the battery, an apparatus of manufacturing the battery and an electricity-consuming device. In some embodiments, the battery includes a battery cell; a case assembly configured to accommodate the battery cell and including a first portion, in which the first portion is arranged at least one side of the battery cell in a first direction; and a first bonding member, in which at least part of the first bonding member is filled between the first portion and the battery cell and bonds the first portion and the battery cell. A first gap is formed between the first portion and the battery cell, and the first gap is configured to release an expansion stress when the battery cell expands. The solutions provided by the embodiments of the present disclosure can improve the energy density and safety of the battery, and prolong the service life of the battery.

18 Claims, 5 Drawing Sheets

(51) Int. Cl.
    *H01M 50/242*  (2021.01)
    *H01M 50/262*  (2021.01)
    *H01M 50/325*  (2021.01)
    *H01M 50/593*  (2021.01)

(52) U.S. Cl.
    CPC ....... *H01M 50/242* (2021.01); *H01M 50/262* (2021.01); *H01M 50/325* (2021.01); *H01M 50/593* (2021.01); *H01M 2220/20* (2013.01)

(58) Field of Classification Search
    CPC ............ H01M 50/103; H01M 50/105; H01M 50/209; H01M 10/647; H01M 50/593
    See application file for complete search history.

(56) References Cited

FOREIGN PATENT DOCUMENTS

| | | |
|---|---|---|
| CN | 108028334 A | 5/2018 |
| CN | 111384334 A | 7/2020 |
| CN | 110190218 B | 9/2020 |
| CN | 112534631 A | 3/2021 |
| CN | 113451633 A | 9/2021 |
| EP | 1775784 A1 | 4/2007 |
| EP | 3723156 A1 | 10/2020 |
| KR | 1020140144871 A1 | 12/2014 |
| WO | 2020261729 A1 | 12/2020 |
| WO | 2021137576 A1 | 7/2021 |
| WO | 2021166625 A1 | 8/2021 |

OTHER PUBLICATIONS

Notice of Reasons for Refusal received in the corresponding Japanese Application 2022-551691, mailed on Jul. 11, 2024.
The extended European search report received in European Application 21938132.4, mailed Jul. 21, 2023.
Notice of Reasons for Refusal received in the corresponding Japanese Application 2022-551691, mailed Jan. 23, 2024.
Decision to Grant a Patent received in the Japanese counterpart application 2022-551691, mailed on Feb. 28, 2025.
International Search Report and Written Opinion received in PCT Application PCT/CN2021/134600 on Jul. 29, 2021.

* cited by examiner

BATTERY, METHOD FOR MANUFACTURING BATTERY, APPARATUS OF MANUFACTURING BATTERY AND ELECTRICITY-CONSUMING DEVICE

CROSS REFERENCE

The present application is a continuation of International Application PCT/CN2021/134600, filed Nov. 30, 2021 and entitled "BATTERY AND ITS MANUFACTURING METHOD AND MANUFACTURING EQUIPMENT AND ELECTRIC DEVICE", the entire content of which is incorporated herein by reference.

TECHNICAL FIELD

The present disclosure relates to the technical field of battery, and in particular relates to a battery and a method for manufacturing the battery, an apparatus of manufacturing the battery and an electricity-consuming device.

BACKGROUND

Energy saving and emission reduction are the keys to the sustainable development of the automobile industry. An electric vehicle has become an important part of the sustainable development of the automobile industry due to the advantage of energy saving and environmental protection. For the electric vehicle, the battery technology is an important factor in its development.

In the development of the battery technology, in addition to improving the performance of a battery cell, the safety factor is also an issue that cannot be ignored. If the safety factor of the battery cell cannot be guaranteed, the battery cell cannot be used. Therefore, how to enhance the safety of battery cells has been an urgent technical problem to be solved in the battery technology.

SUMMARY

The present disclosure provides a battery and a method for manufacturing the battery, an apparatus of manufacturing the battery and an electricity-consuming device, which can improve the service life and the using safety of the battery and the electricity-consuming device.

In a first aspect, the present disclosure provides a battery, including a battery cell, a case assembly and a first bonding member. The case assembly is configured to accommodate the battery cell and includes a first portion, and the first portion is arranged at at least one side of the battery cell in a first direction. At least part of the first bonding member is filled between the first portion and the battery cell and bonds the first portion and the battery cell. A first gap is formed between the first portion and the battery cell, and the first gap is configured to release an expansion stress when the battery cell expands.

In the technical solution of the present disclosure, the first bonding member is used to connect the battery cell and the case assembly, so that the battery has a higher overall rigidity and a higher structural strength. The first gap formed between the battery cell and the first portion reserves an expansion space for the battery cell, which can avoid the thermal runaway because an electrode assembly in the battery cell cannot expand, and improve the service life and safety of the battery. At the same time, by forming the first gap, a space occupied by the first bonding member in the direction of the large surface of the battery cell can be reduced, and the energy density of the battery can be improved.

In some embodiments, the battery cell includes two first surfaces arranged to be opposite to each other in the first direction, the first bonding member is bonded to the first surface, and the first gap corresponds to a central region of the first surface.

In the above solution, a direction of the expansion of the battery cell is perpendicular to the first surface, a law of the expansion and deformation of the battery cell satisfies the characteristics of large middle and small edges, and the first gap corresponds to the central region of the first surface, so that there is an enough deformation space for the expansion of the battery cell to prevent potential safety hazards caused by the insufficient expansion of the battery cell.

In some embodiments, the first bonding member is arranged around the first gap.

In some embodiments, the first surface is a surface with the largest area of the battery cell.

In the above solution, the first surface is the surface with the largest area of the battery cell. The first surface is arranged to directly face to the large surface of the electrode assembly inside the battery cell, so the first surface is a main deformation surface of the battery cell. By arranging the first gap corresponding to the first surface, the expansion of the battery cell can be better absorbed, and the service life and the safety of the battery can be improved.

In some embodiments, at least one side of the first gap extends to an edge of the first surface.

In the above solution, at least one side of the first gap extends to the edge of the first surface, so as to facilitate the exhaust of the first gap when it is compressed and avoid the phenomenon "breathing", which may result in the failure of bonding of the first bonding member or the occurrence of air bubbles during bonding, occurs in the first gap.

In some embodiments, the first surface includes a first region and a second region, the first bonding member is bonded to the first region, and the first gap is formed between the second region and the first portion.

In some embodiments, a ratio of an area of the second region to a total area of the first surface is 6%-45%.

In some embodiments, a dimension of the first surface in a second direction is L1, and a dimension of the second region in the second direction is X1, $1/4 \leq X1/L1 \leq 2/3$; a dimension of the first surface in the third direction is L2, and a dimension of the second region in a third direction is X2, $1/4 \leq X2/L2 \leq 2/3$; the second direction and the third direction are perpendicular to each other and both are parallel to the first surface.

In the above solution, by defining the shape and area of the second region, the strength of the battery and the deformation of the battery cell can be taken into account, and at the same time, it is convenient to apply glue and simplify the processing technology.

In some embodiments, the battery cell further includes two second surfaces arranged to be opposite to each other in a horizontal direction, in which the second surfaces are connected to the first surface, and a pressure relief mechanism arranged on the second surface; an opening of the first gap faces the pressure relief mechanism, and the pressure relief mechanism is configured to relieve an internal pressure of the battery cell when the internal pressure reaches to a threshold value.

In the above solution, the first gap facing the pressure relief mechanism can prevent the first bonding member from spreading to the second surface and block the pressure relief mechanism, thereby ensuring the normal use of the pressure relief mechanism and improving safety.

In some embodiments, the battery further includes an isolation component, the isolation component is arranged between the first portion and the battery cell, and the isolation component surrounds the first gap and separates the first bonding member from the first gap. The isolation component effectively separates the first bonding member and the first gap, so as to prevent the first bonding member from spreading, reducing the first gap and affecting the expansion and deformation of the battery cell.

In some embodiments, the battery includes a plurality of battery cells, and the plurality of battery cells are arranged in at least two layers in the first direction. The battery further includes a second bonding member, and the second bonding member is filled between the adjacent battery cells. A second gap is formed between the adjacent battery cells, and the second gap is configured to release the expansion stress of the battery cells when the battery cells expand.

In the above solution, by arranging the second gap, the battery cells can release the expansion stress on the two first surfaces, so that the deformation of the battery cells can be uniform, and the service life of the battery can be improved.

In some embodiments, the case assembly includes a lower case body, an upper case cover and at least one fixing member, the fixing member is mounted on the lower case body, the lower case body and the upper case cover are arranged in the first direction and connected to each other, and the battery cell and the fixing member are arranged in an accommodating space surrounded by the lower case body and the upper case cover; one fixing member is provided, the battery cell is sandwiched and mounted between the fixing member and the lower case body, and a part of the lower case body or the fixing member arranged at the side of the battery cell in the first direction is the first portion; and/or two fixing portions are provided, the battery cell is sandwiched and mounted between the two fixing portions, and a part of the two fixing members arranged at the side of the battery cell in the first direction is the first portion.

In some embodiments, the battery cell includes the electrode assembly, and the electrode assembly includes a first electrode sheet and a second electrode sheet; the first electrode sheet and the second electrode sheet are wound around a winding axis and form a winding structure, and the winding axis is parallel to the first portion; or the electrode assembly includes a plurality of first electrode sheets and a plurality of second electrode sheets, and the plurality of first electrode sheets and the plurality of second electrode sheets are alternately stacked in the first direction; or the electrode assembly includes a plurality of second electrode sheets, the first electrode sheet includes a plurality of layer-stacking sections arranged to be stacked and a plurality of bending sections, each of the bending sections is connected to two adjacent layer-stacking sections, the plurality of layer-stacking sections and the plurality of second electrode sheets are alternately stacked in the first direction, and the first direction is perpendicular to the first portion.

In a second aspect, the embodiments of the present disclosure provides an electricity-consuming device, including the battery according to any one of the above solutions, and the battery is configured to provide electrical energy.

In a third aspect, the embodiments of the present disclosure provides a method for manufacturing the battery, including
providing a battery cell;
providing a case assembly, in which the case assembly includes a first portion;
providing a first bonding member;
arranging the first portion at least one side of the battery cell in a first direction, filling at least part of the first bonding member between the first portion and the battery cell and bonds the first portion and the battery cell, and forming a first gap is formed between the first portion and the battery cell, in which the first gap is configured to release an expansion stress when the battery cell expands.

In a fourth aspect, the embodiments of the present disclosure provides an apparatus of manufacturing the battery, including
a first providing device, configured to provide a battery cell;
a second providing device, configured to provide a case assembly, in which the case assembly includes a first portion;
a first assembling device, configured to arrange the first portion at at least one side of the battery cell in a first direction;
a third providing device, configured to provide a first bonding member;
a second assembling device, configured to fill at least part of the first bonding member between the first portion and the battery cell and bonds the first portion and the battery cell, in which a first gap is formed between the first portion and the battery cell, and the first gap is configured to release an expansion stress when the battery cell expands.

According to the solutions provided by the embodiments of the present disclosure, the case assembly of the battery includes the first portion, the first bonding member is used to bond the battery cell and the first portion, and a first gap is arranged between the battery cell and the first portion, so that the first bonding member does not need to coat the entire surface of the battery cell, which can reduce the usage of the first bonding member and increase the energy density of the battery. The first gap reserves an expansion space for the battery cell, which can avoid the thermal runaway because the electrode assembly in the battery cell cannot expand, and improve the service life and safety of the battery. At the same time, by forming the first gap, a space occupied by the first bonding member in the direction of the large surface of the battery cell can be reduced, and the energy density of the battery can be improved.

BRIEF DESCRIPTION OF THE DRAWINGS

In order to more clearly illustrate the technical solutions of the embodiments of the present disclosure, the drawings to be used in the description of the embodiments of the present disclosure will be described briefly below. Obviously, the drawings in the following description are merely some embodiments of the present disclosure. For those skilled in the art, other drawings can also be obtained according to these drawings without the inventive labor.

DETAILED DESCRIPTION

Figure 1:
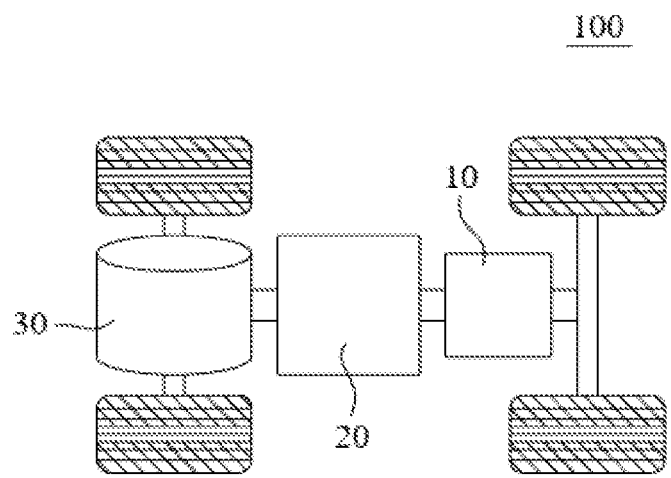
FIG. 1 shows a schematic structural view of a vehicle provided by some embodiments of the present disclosure.

In order to make the objects, technical solutions and advantages of the embodiments of the present disclosure more clear, the technical solutions of the embodiments of the present disclosure will be clearly and completely described below in conjunction with the drawings of the embodiments of the present disclosure. It is apparent that the described embodiments are a part of the embodiments of the present disclosure, and not all of them. Based on the described embodiments of the present disclosure, all other embodiments obtained by those skilled in the art without the inventive labor fall within the scope of the disclosure.

Unless otherwise defined, all technical and scientific terms used herein have the same meaning as commonly understood by those skilled in the technical filed to which the present disclosure belongs. The terminology used in the description of the present disclosure is for the purpose of describing particular embodiments only and is not intended to limit the present disclosure. The terms "comprising" and "having" and any variations thereof in the description and claims of the present disclosure and the above description of the drawings are intended to cover non-exclusive inclusions. In the description, claims or drawings of the embodiments of the present disclosure, the technical terms "first", "second" and the like are only used to distinguish different objects, and should not be understood as describing the specific order or the priority relationship of the indicated technical features.

The "embodiment" referred in the present disclosure means that a particular feature, a structure, or a characteristic described in connection with the embodiment can be included in at least one embodiment of the present disclosure. The appearances of the phrase in various positions in the specification are not necessarily all referring to the same embodiment, nor a separate or alternative embodiment that is mutually exclusive of other embodiments. It is explicitly and implicitly understood by those skilled in the art that the embodiments described in the present disclosure may be combined with other embodiments.

In the description of the present disclosure, it should also be noted that, unless otherwise clearly specified and limited, the terms "mount", "communicate", "connect" and "fix" should be understood in a broad sense, for example, it can be a fixed connection, a detachable connection, or an integral connection, it can be a mechanical connection or an electrical connection; it can be a direct connection, or it can be connected indirectly through an intermediary, it can be a communication within the two elements. For those of ordinary skill in the art, the specific meaning of the above-mentioned terms in the present disclosure can be understood according to specific situations.

In the present disclosure, the term "and/or" is merely an association to describe the associated objects. It can mean that there are three kinds of relationships, such as A and/or B, which means that A exists alone, A and B exist at the same time, and B exists alone. In addition, the character "I" in the present disclosure generally indicates that the related objects are an "or" relationship.

In the embodiments of the present disclosure, the same reference numeral denotes the same component, and for the sake of brevity, the detailed description of the same component can be omitted in different embodiments. It should be understood that the thickness, length, width and other dimensions of various components in the embodiments of the present disclosure shown in the accompanying drawings, as well as the overall thickness, length and width and the like of the integrated device are only exemplary descriptions, and should not constitute any limitation to the present disclosure.

In the present disclosure, the "plurality" refers to two or more (including two).

In the present disclosure, the battery cell may include a lithium-ion secondary battery cell, a lithium-ion primary battery cell, a lithium-sulfur battery cell, a sodium-lithium-ion battery cell, a sodium-ion battery cell or a magnesium-ion battery cell and the like, which are not limited in the embodiments of the present disclosure. The battery cell may be in a shape of a cylinder, a flat body, a cuboid or other shapes, which are not limited in the embodiments of the present disclosure.

Reference numbers in the drawings show as followed:
1. battery cell; 11. shell; 111. first surface; 111a. first region; 111b. second region; 112. second surface; 112a. third region; 112b. fourth region; 113. third surface; 12. electrode terminal; 13. pressure relief mechanism; 14. electrode assembly; 141. first electrode sheet; 1411. layer-stacking section; 1412. bending section; 142. second electrode sheet; 143. isolation member; 144. winding axis; 2. case assembly; 21. first case body; 22. second case body; 23. fixing member; 3. first bonding member; 4. isolation component; 5. first gap; 6. second bonding member; 7. second gap; 10. battery; 20. controller; 30. motor; 100. vehicle The battery mentioned in the embodiments of the present disclosure refers to a single physical module including one or more battery cells to provide a higher voltage and capacity. For example, the battery mentioned in the present disclosure may include a battery module or a battery pack or the like. The battery typically includes a case assembly for enclosing one or more battery cells. The case assembly can restrict the liquid or other foreign objects from affecting the charging or discharging of the battery cell.

The battery cell includes an electrode assembly and an electrolyte, and the electrode assembly includes a positive electrode sheet, a negative electrode sheet and an isolation member. The battery cell mainly relies on the movement of metal ions between the positive electrode sheet and the negative electrode sheet to work. The positive electrode sheet includes a positive electrode current collector and a positive electrode active material layer, and the positive electrode active material layer coats a surface of the positive electrode current collector. The positive electrode current collector includes a positive electrode coating region and a positive electrode tab connected to the positive electrode coating region, the positive electrode coating region is coated with the positive electrode active material layer, and the positive electrode tab is not coated with the positive electrode active material layer. Taking a lithium-ion battery as an example, the material of the positive electrode current collector can be the aluminum, the positive electrode active material layer includes a positive electrode active material, and the positive electrode active material can be the lithium cobalt oxide, the lithium iron phosphate, the ternary lithium or the lithium manganate or the like. The negative electrode sheet includes a negative electrode current collector and a negative electrode active material layer, and the negative electrode active material layer coats a surface of the negative electrode current collector. The negative electrode current collector includes a negative electrode coating region and a negative electrode tab connected to the negative electrode coating region, the negative electrode coating region is coated with a negative electrode active material layer, and the negative electrode tab is not coated with the negative electrode active material layer. The material of the negative electrode current collector can be the copper, the negative electrode active material layer includes a negative electrode active material, and the negative electrode active material can be the carbon or the silicon or the like. The material of the isolation member may be PP (polypropylene, polypropylene) or PE (polyethylene, polyethylene).

In the related art, the battery cell of the battery is connected with the case assembly through a bonding member. The entire surface of the bonding member coats the surface of the battery cell, so as to connect the battery cell and the case assembly into a whole, and improve the overall rigidity and strength of the battery. The inventor found that, on the one hand, the solution of bonding the entire surface of the bonding member increases the usage of the bonding member and the weight of a battery system, which affects the energy density of the battery; on the other hand, the bonding member occupies an original reserved space in the direction of the large surface of the battery cell, which affects the expansion and the service life of the battery cell.

In view of this situation, the present disclosure provides a technical solution. In the technical solution, the case assembly includes a first portion, a first bonding member is used to bond the battery cell and the first portion, and a first gap is arranged between the battery cell and the first portion. The solution reduces the usage of the first bonding member, increases the energy density of the battery, and at the same time, the first gap can reserve an expansion space of the battery cell, thereby improving the safety and the service life of the battery.

The technical solutions described in the embodiments of the present disclosure are adapted to an electricity-consuming device using the battery.

The electricity-consuming device can be a vehicle, a mobile phone, a portable device, a notebook computer, a ship, a spacecraft, an electric toy, an electric tool and the like. The vehicle can be a fuel vehicle, a gas vehicle or a new energy vehicle, and the new energy vehicle can be a pure electric vehicle, a hybrid vehicle or an extended-range vehicles or the like; the spacecraft includes an airplane, a rocket, a space shuttle and a spacecraft and the like; the electric toy includes a stationary or a mobile electric toy, such as a game console, an electric car toy, an electric ship toy, an electric airplane toys and the like; the power tool includes a metal cutting power tool, a grinding power tool, an assembling power tool, and a railway power tool, such as a power drill, a power grinder, a power wrench, a power screwdriver, a hammer, an impact drill, a concrete vibrator, a planers and the like. The embodiments of the present disclosure do not restrict the above-mentioned electricity-consuming devices.

For the convenience of description, the following embodiments are described by taking the electricity-consuming device as the vehicle as an example.

FIG. 1 shows a schematic structural view of the vehicle provided by some embodiments of the present disclosure.

As shown in FIG. 1, an interior of the vehicle 100 is provided with a battery 10. The battery 10 may be arranged at a bottom, a head or a rear of the vehicle 100. The battery 10 may be used for power supply of the vehicle 100, for example, the battery 10 may be used as an operating power source of the vehicle 100.

The vehicle 100 may also include a controller 20 and a motor 30. The controller 20 can be used to control the battery 10 to supply power to the motor 30, for example, to meet the working power requirements of the vehicle 100 during starting, navigating and driving.

In some embodiments of the present disclosure, the battery 10 can not only be used as the operating power source of the vehicle 100, but also can be used as a driving power source of the vehicle 100 to provide the driving power for the vehicle 100 instead of or partially instead of the fuel or the natural gas.

Figure 2:
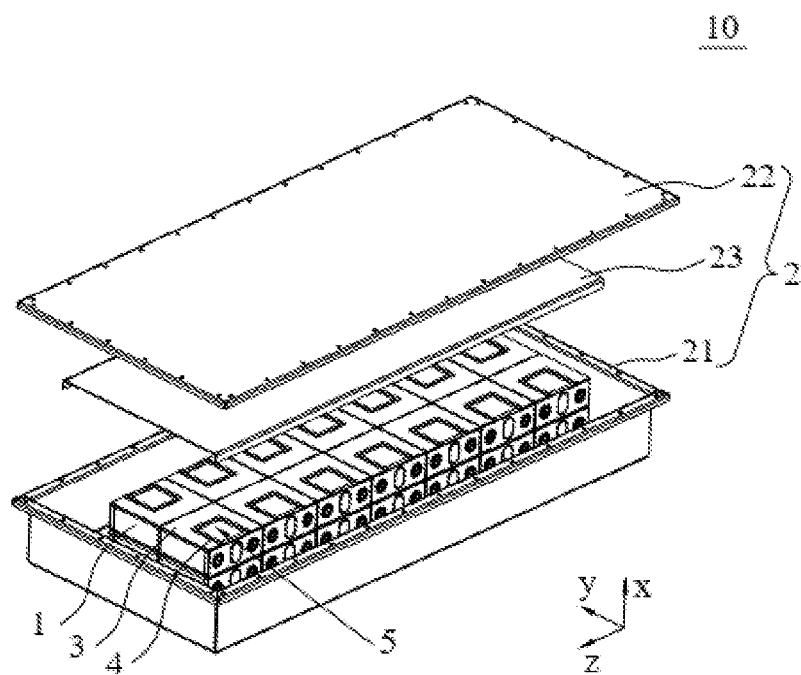
FIG. 2 shows an exploded schematic view of a battery provided by some embodiments of the present disclosure.

FIG. 2 shows an exploded schematic view of the battery provided by some embodiments of the present disclosure. As shown in FIG. 2, the present disclosure provides the battery 10, including a battery cell 1 and a case assembly 2. The battery cell 1 is configured to provide the electrical energy. The case assembly 2 is configured to accommodate the battery cell 1 and includes a first portion, and the first portion is arranged at at least one side of the battery cell 1 in a first direction. The battery 10 further includes a first bonding member 3. At least part of the first bonding member 3 is filled between the first portion and the battery cell 1 and bonds the first portion and the battery cell 1. A first gap 5 is formed between the first portion and the battery cell 1, and the first gap 5 is configured to release an expansion stress when the battery cell 1 expands.

According to the battery 10 provided by the embodiments of the present disclosure, the first bonding member 3 is used to bond the battery cell 1 and the first portion, and the first gap 5 is arranged between the battery cell 1 and the first portion, so that the first bonding member 3 does not need to coat the entire surface of the battery cell 1, which can reduce the usage of the first bonding member 3 and increase the energy density of the battery 10. On the other hand, the first gap 5 reserves an expansion space for the battery cell 1, which can avoid the thermal runaway because the electrode assembly in the battery cell 1 cannot expand, and improve the service life and safety of the battery cell 1.

As shown in FIG. 2, for the convenience of description, a cartesian coordinate system X-Y-Z is defined. The first direction is defined as an X direction, a second direction is defined as a Z direction, and a third direction is defined as a Y direction. Herein, the first direction X is a normal direction of the surface of the battery cell 1 for bonding the first bonding member 3.

In some embodiments, the case assembly 2 includes a lower case body 21, an upper case cover 22 and at least one fixing member 23, the fixing member 23 is mounted on the lower case body 21, the lower case body 21 and the upper case cover 22 are arranged in the first direction X and connected to each other, and the battery cell 1 and the fixing member 23 are arranged in an accommodating space surrounded by the lower case body 21 and the upper case cover 22; one fixing member 23 is provided, the battery cell 1 is sandwiched and mounted between the fixing member 23 and the lower case body 21, and a part of the lower case body 21 or the fixing member 23 arranged at the side of the battery cell 1 in the first direction X is the first portion; and/or two fixing portions are provided, the battery cell 1 is sandwiched and mounted between the two fixing members 23, and a part of the two fixing members 23 arranged at the side of the battery cell 1 in the first direction X is the first portion.

In some embodiments, the case assembly 2 includes two fixing members 23. At least part of one fixing member 23 is arranged between the battery cell 1 and the lower case body 21, and at least part of the other fixing member 23 is arranged between the battery cell 1 and the upper case cover 22, and the first bonding member 3 is filled with between the battery cell 1 and the two fixing members 23. The portion of the two fixing members 23 arranged at one side of the battery cell 1 in the first direction X is the first portion.

In some other embodiments, the case assembly 2 includes one fixing member 23. At least part of the fixing member 23 is arranged between the battery cell 1 and the upper case cover 22, a part of the first bonding member 3 is filled between the battery cell 1 and the fixing member 23, and a part of the first bonding member 3 is filled between the battery cell 1 and the lower case body 21.

In some other embodiments, the case assembly 2 includes one fixing member 23. At least part of the fixing member 23 is arranged between the battery cell 1 and the lower case body 21, a part of the first bonding member 3 is filled between the battery cell 1 and the fixing member 23, and a part of the first bonding member 3 is filled between the battery cell 1 and the upper case cover 22.

Certainly, in some other embodiments, the case assembly 2 may also include only the lower case body 21 and the upper case cover 22, and the case assembly 2 does not include the fixing member 23. The battery cell 1 is directly bonded to the lower case body 21 and the upper case cover 22, a part of the first bonding member 3 is filled between the battery cell 1 and the lower case body 21, and a part of the first bonding member 3 is filled between the battery cell 1 and the upper case cover 22. The lower case body 21 and/or the upper case cover 22 is the first portion.

The case assembly 2 can be of various structures. In some embodiments, the lower case body 21 may be of a hollow structure with an opening at an end, the upper case cover 22 may be of a plate-like structure, and the upper case cover 22 covers and closes at an opening side of the lower case body 21 to form the case assembly 2 with the accommodating space. Each of the lower case body 21 and the upper case cover 22 may also be a hollow structure with an opening at a side, and an opening side of the upper case cover 22 covers and closes the opening side of the lower case body 21 to form a case body with the accommodating space. Of course, the lower case body 21 and the upper case cover 22 may also be various shapes, such as a cylinder, a rectangular parallelepiped and the like.

In some embodiments, the fixing member 23 includes a first fixing portion bonded with the battery cell 1 and a second fixing portion fixed with the lower case body 21. A surface of the first fixing portion at a side directly faces to the battery cell 1, and a surface of the first fixing portion at the other side directly faces to the lower case body 21 or the upper case cover 22. The second fixing portion may be a structure bent toward the battery cell 1 relative to the first fixing portion, or the second fixing portion may be a separate component assembled to the first fixing portion. The second fixing portion is arranged at one side or two sides of the first fixing portion, and the second fixing portion and the lower case body 21 are connected by a screw or fixed by snapping.

The lower case body 21 and the upper case cover 22 are connected together by means of the screw connection, the snapping connection or the glue connection. In order to improve the sealing performance after the lower case body 21 and the upper case cover 22 are connected, a sealing member, such as a sealant, a sealing ring or the like, may also be arranged between the lower case body 21 and the upper case cover 22.

In the battery 10, the number of battery cells 1 may be one or more. If there are a plurality of battery cells 1, the plurality of battery cells 1 can be connected in series or in parallel or in a mixed connection, and the mixed connection means that the plurality of battery cells 1 have both the series connection and the parallel connection. The plurality of battery cells 1 can be connected in series, in parallel or mixed together, then the whole formed by the plurality of battery cells 1 is accommodated in the case, and the plurality of battery cells 1 are electrically connected through a bus component. Of course, the plurality of battery cells 1 can also be connected in series or in parallel or mixed to form a battery module, and then the plurality of battery modules can be connected in series or in parallel or mixed to form a whole and are accommodated in the case.

Figure 3:
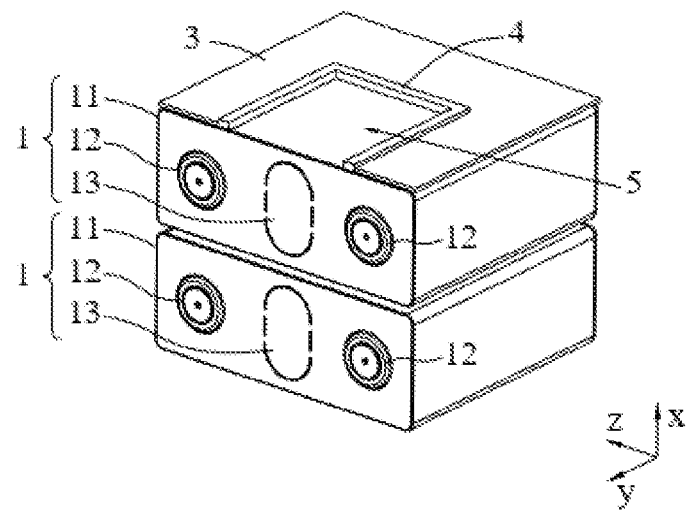
FIG. 3 shows a structure view of some components of a battery provided by some embodiments of the present disclosure.
Figure 4:
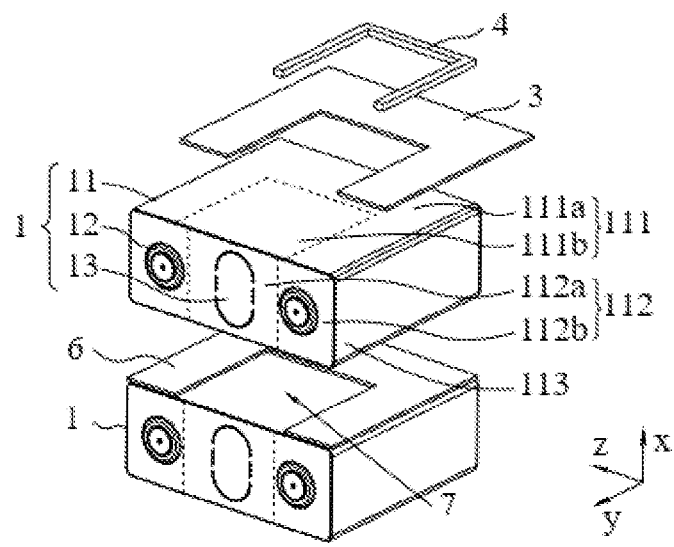
FIG. 4 shows an exploded schematic view of some components of a battery provided by some embodiments of the present disclosure.

FIG. 3 shows a structure view of some components of a battery provided by some embodiments of the present disclosure, and FIG. 4 shows an exploded schematic view of some components of a battery provided by some embodiments of the present disclosure. As shown in FIG. 3 and FIG. 4, the battery cell 1 includes a shell 11, an electrode terminal 12 and a pressure relief mechanism 13, and each of the electrode terminal 12 and the pressure relief mechanism 13 is mounted on the shell 11. Two electrode terminals 12 are provided, the two electrode terminals 12 are used to lead the electric energy in the battery cell 1 to the outside, and the pressure relief mechanism 13 is used to release the pressure.

Figure 5:
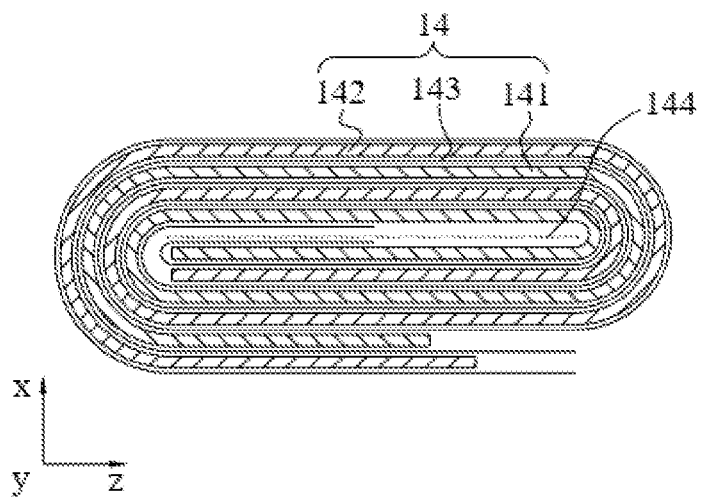
FIG. 5 shows a cross-sectional view of an electrode assembly of a battery provided by some embodiments of the present disclosure.

The battery cell 1 further includes the electrode assembly, the electrode assembly is arranged in the shell 11, and the electrode assembly is used to supply the electrical energy. FIG. 5 shows a cross-sectional view of an electrode assembly of a battery provided by some embodiments of the present disclosure. As shown in FIG. 5, in some embodiments, the battery cell 1 includes the electrode assembly 14. The electrode assembly 14 includes a first electrode sheet 141 and a second electrode sheet 142. The first electrode sheet 141 and the second electrode sheet 142 are wound around a winding axis 144 to form a winding structure. The winding axis 144 is parallel to the first portion.

Figure 6:
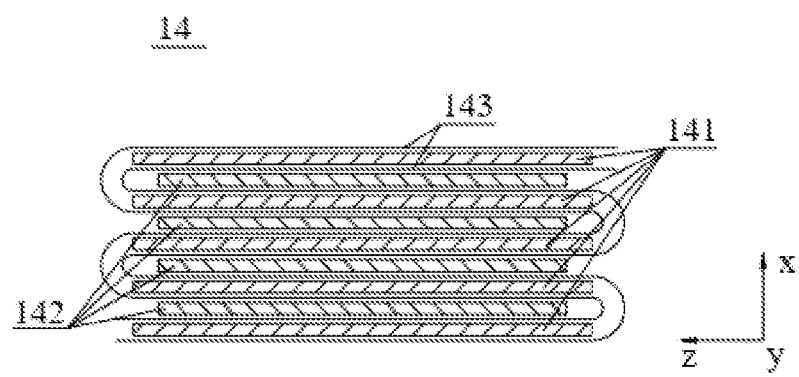
FIG. 6 shows a cross-sectional view of an electrode assembly of a battery provided by some other embodiments of the present disclosure.

FIG. 6 shows a cross-sectional view of an electrode assembly of a battery provided by some other embodiments of the present disclosure. As shown in FIG. 6, in some other embodiments, the electrode assembly 14 includes a plurality of first electrode sheets 141 and a plurality of second electrode sheets 142, and the plurality of first electrode sheets 141 and the plurality of second electrode sheets 142 are alternately stacked in the first direction X.

Figure 7:
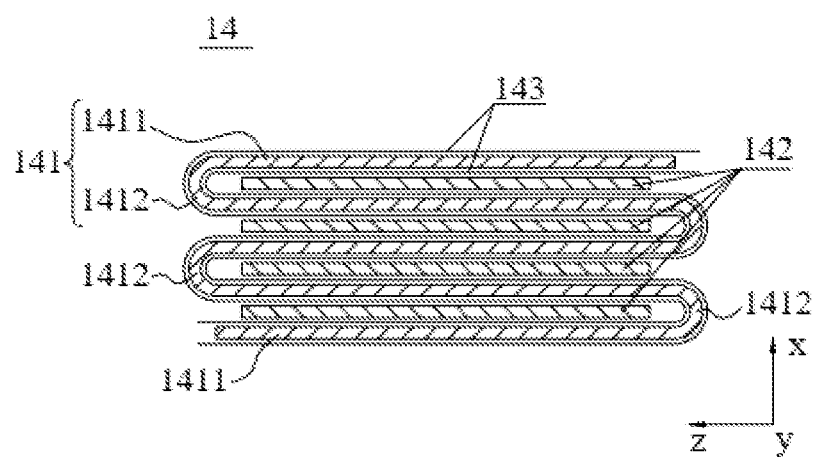
FIG. 7 shows a cross-sectional view of an electrode assembly of a battery provided by some other embodiments of the present disclosure.

FIG. 7 shows a cross-sectional view of an electrode assembly of a battery provided by some other embodiments of the present disclosure, as shown in FIG. 7, in some other embodiments, the electrode assembly 14 includes the first electrode sheet 141 and the plurality of second electrode sheets 142, the first electrode sheet 141 includes a plurality of layer-stacking sections 1411 arranged to be stacked and a plurality of bending sections 1412, each of the bending sections 1412 is connected to two adjacent layer-stacking sections 1411, the plurality of layer-stacking sections 1411 and the plurality of second electrode sheets 142 are alternately stacked in the first direction X, and the first direction X is perpendicular to the first portion.

As shown in FIGS. 5-7, the electrode assembly 14 further includes the isolation member 143 arranged between the first electrode sheet 141 and the second electrode sheet 142, and the isolation member 143 is used to form a channel for metal ions to pass through while preventing electrons from passing through.

In the above embodiments, the polarities of the first electrode sheet 141 and the second electrode sheet 142 are not limited. The first electrode sheet 141 may be a positive electrode sheet, and the second electrode sheet 142 may be a negative electrode sheet, or the first electrode sheet 141 may be a negative electrode sheet, and the second electrode sheet 142 may be a positive electrode sheet. The two electrode terminals 12 are respectively electrically connected to a positive tab of the positive electrode sheet and a negative tab of the negative electrode sheet.

In some embodiments, the battery cell 1 includes two first surfaces 111 arranged to be opposite to each other in the first direction X, the first bonding member 3 is bonded to the first surface 111, and the first gap 5 corresponds to a central region of the first surface 111.

A direction of the expansion of the battery cell 1 is perpendicular to the first surface 111, a law of the expansion and deformation of the battery cell 1 satisfies the characteristics of large middle and small edges, and the first gap 5 corresponds to the central region of the first surface 111, so that there is an enough deformation space for the expansion of the battery cell 1 to prevent potential safety hazards caused by the insufficient expansion of the battery cell 1.

The shell 11 of the battery cell 1 is in the shape of a hexahedron, and the two first surfaces 111 are two surfaces of the shell 11 arranged to be opposite to each other in the first direction X.

In some embodiments, the first surface 111 is a surface with the largest area of the battery cell 1.

In some embodiments, the electrode assembly 14 includes two large faces. The two large faces are the two surfaces parallel to the first portion. The two large faces of the electrode assembly 14 directly face to the two first surfaces 111 of the battery cell 1 respectively. The electrode assembly 14 will expand in the normal direction of the large face during working, and the electrode assembly 14 expands and squeezes the shell 11 to cause the expansion of the first surface 111 of the battery cell 1.

The first surface 111 is the surface with the largest area of the battery cell 1. The first surface 111 is arranged to directly face to the large surface of the electrode assembly 14 inside the battery cell 1, so the first surface 111 is a main deformation surface of the battery cell 1. By arranging the first gap 5 corresponding to the first surface 111, the expansion of the battery cell 1 can be better absorbed, and the service life and the safety of the battery 10 can be improved.

In some embodiments, the first bonding member 3 is arranged around the first gap 5.

The first bonding member 3 may completely or partially surround the first gap 5. When the first bonding member 3 completely surrounds the first gap 5, the first gap 5 is surrounded by the battery cell 1, the first portion and the first bonding member 3 to form a closed space. When the first bonding member 3 partially surrounds the first gap 5, the first gap 5 is surrounded by the battery cell 1, the first portion and the first bonding member 3 to form a semi-closed space, and a portion of the first gap 5 that is not surrounded by the first bonding member 3 becomes an opening of the gap.

In some embodiments, at least one side of the first gap 5 extends to an edge of the first surface 111.

In the above solution, the first gap 5 is the semi-closed space, and a side of the first gap 5 extending to the edge of the first surface 111 becomes the opening of the gap. When the battery cell 1 expands, the first surface 111 expands and deforms toward the first portion, a thickness of the first gap 5 in the first direction X decreases, and a volume of the first gap 5 decreases. At this time, the gas in the first gap 5 is compressed, and the compressed gas is discharged to a side face of the battery cell 1 from the opening of the gap.

By arranging the first gap 5 to be a semi-closed space, at least one side of the first gap 5 extending to the edge of the first surface 111 can discharge the compressed gas in time, thereby reducing the resistance of the compressed gas to the deformation of the battery cell 1, so as to prevent the battery cell 1 and the case assembly 2 from being poorly bonded due to the escape of compressed gas and improve the strength, the rigidity and the safety of the battery 10.

In some embodiments, the first surface 111 includes a first region 111a and a second region 111b, the first bonding member 3 is bonded to the first region 111a, and the first gap 5 is formed between the second region 111b and the first portion.

The second region 111b is the region directly facing to the first gap 5, so the second region 111b is the central region of the first surface 111, and the first region 111a is a peripheral region of the first surface 111 and communicates with the second region 111b. In some embodiments, at least one side of the second region 111b extends to the edge of the first surface 111, so that forms the opening of the gap can be formed by the second region 111b with the first portion and the first bonding member 3.

A projected shape of the first gap 5 on the first surface 111 may be various shapes, such as a rectangle, a triangle, a circle or the like, as long as the first gap 5 directly faces to the central region of the first surface 111. That is, the shape of the second region 111b may be a rectangle, a triangle, a circle, or the like.

In some embodiments, a ratio of an area of the second region 111b to a total area of the first surface 111 is 6%-45%.

In some preferred embodiments, the ratio of the area of the second region 111b to the total area of the first surface 111 is 10%-30%. The above area ratio of the second region 111b to the first surface 111 can not only make the first bonding member 3 have a sufficient bonding area, which can ensure the bonding firmness between the battery cell 1 and the case assembly 2, but also ensure the normal expansion and deformation of the battery cell 1, so that it can ensure the safety of the battery 10.

Figure 8:
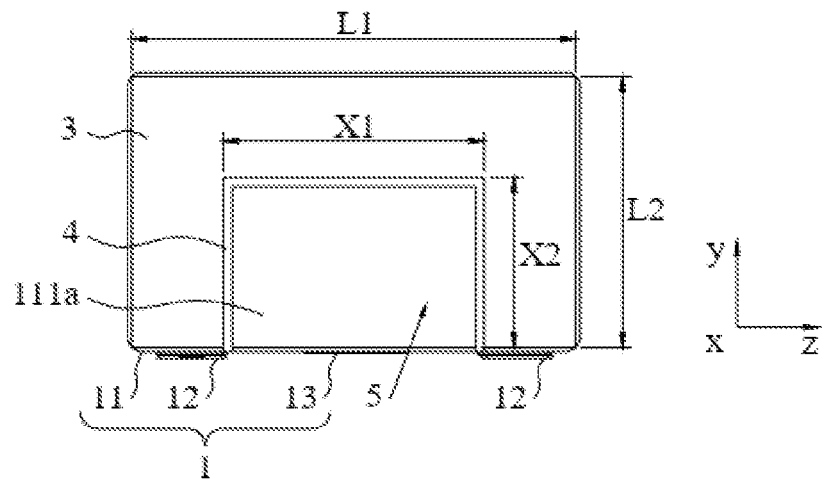
FIG. 8 shows a top view of some components of a battery provided by some embodiments of the present disclosure.

As shown in FIG. 8, in some embodiments, the shape of the second region 111b is the rectangle. The shape of the second region 111b is arranged to be the rectangle, which can be convenient for being coated with the first bonding member 3 and improves the efficiency of coating.

In some embodiments, a dimension of the first surface 111 in the second direction Z is L1, and a dimension of the second region 111b in the second direction Z is X1, $\frac{1}{4} \leq X1/L1 \leq \frac{2}{3}$; a dimension of the first surface 111 in the third direction Y is L2, and a dimension of the second region 111b in the third direction Y is X2, $\frac{1}{4} \leq X2/L2 \leq \frac{2}{3}$; the second direction Z and the third direction Y are perpendicular to each other and both are parallel to the first surface 111.

In some embodiments, one side of the second region 111b coincides with one side of the first surface 111, and the side directly faces to the opening of the gap. When the first gap 5 is compressed, the compressed gas is discharged from the opening of the gap toward the side face of the battery cell 1. Of course, in some embodiments, on the basis of ensuring the bonding strength, two or three sides of the second region 111b can also overlap with the sides of the first surface 111 to better discharge the compressed gas.

As shown in FIG. 4 to FIG. 9, in some embodiments, the battery cell 1 further includes two second surfaces 112 arranged to be opposite to each other in a horizontal direction. The second surface 112 is connected to the first surface 111. The battery cell 1 further includes the pressure relief mechanism 13. The pressure relief mechanism 13 is arranged on the second surface 112. An opening of the first gap 5 faces the pressure relief mechanism 13, and the pressure relief mechanism 13 is configured to relieve an internal pressure of the battery cell 1 when the internal pressure reaches to a threshold value.

The two second surfaces 112 are two surfaces of the shell 11 of the battery cell 1 that are arranged to be opposite to each other in the third direction Y. In some embodiments, the battery cell 1 further includes two third surfaces 113. The two third surfaces 113 are two surfaces of the shell 11 arranged to be opposite to each other in the second direction Z, and the two third surfaces 113 are connected to the two second surfaces 112 and the two first surfaces 111. The second direction Z and the third direction Y are perpendicular to each other and are both parallel to the first surface 111.

The pressure relief mechanism 13 communicates with an internal space of the battery cell 1. The pressure relief mechanism 13 can be opened toward the outside of the battery cell 1 to release the high-pressure gas when the internal pressure of the battery cell 1 reaches to or exceeds the threshold value. In some embodiments, the pressure relief mechanism 13 generally adopts a pressure relief valve.

After the first surface 111 of the battery cell 1 is coated with the first bonding member 3, the first bonding member 3 has the fluidity. The first bonding member 3 spreads to the periphery of the first surface 111, the second surface 112 and the third surface 113 as the assembly is pressurized. In this solution, the opening of the first gap 5 faces to the pressure relief mechanism 13, so that it can prevent the first bonding member 3 from spreading and blocking the pressure relief mechanism 13 to affect the exhaust of the battery cell 1, thereby improving the safety of the battery cell 1.

In some embodiments, the second surface 112 includes a third region 112a and a fourth region 112b that communicate with each other, the third region 112a is connected to the second region 111b, the fourth region 112b is connected to the first region 111a, and the pressure relief mechanism 13 is arranged in the third region 112a. Since the second region 111b directly faces to the first gap 5, the first bonding member 3 will not spread to the third region 112a during the assembly process of the battery 10, thereby ensuring the normal operation of the pressure relief mechanism 13.

Of course, in some other embodiments, the pressure relief mechanism 13 can also be arranged on the third surface 113 of the battery cell 1, as long as it is ensured that the opening of the first gap 5 faces to the pressure relief mechanism 13.

The first bonding member 3 has the bondable property, the first bonding member 3 is liquid or paste-like before solidification, has a certain fluidity, and become solid after solidification. In some embodiments, the first bonding member 3 includes one or more of an epoxy resin, a polyurethane and an acrylic resin. The first bonding member 3 coats on the first surface 111 of the battery cell 1 and/or the surface at the side of the first portion facing to the battery cell 1.

In some embodiments, the battery 10 further includes an isolation component 4. The isolation component 4 is arranged between the first portion and the battery cell 1, and the isolation component 4 surrounds the first gap 5 and separates the first bonding member 3 from the first gap 5.

The isolation component 4 can effectively prevent the first bonding member 3 from spreading toward the first gap 5, avoid the first bonding member 3 from spreading to cause the projected area of the first gap 5 to decrease, and ensure that the battery cell 1 has a sufficient space for expansion and deformation. The isolation component 4 corresponds to a region where the first bonding member 3 surrounds the first gap 5. In some embodiments, the isolation component 4 completely surrounds the first gap 5, and the first gap 5 is a closed space; in other embodiments, the isolation component 4 partially surrounds the first gap 5, and a part of the isolation component 4 that does not surround the first gap 5 forms the opening of the first gap 5, and the opening is used to discharge the gas in the first gap 5 when the battery cell 1 expands.

In some embodiments, the isolation component 4 is made of a foam, a rubber and other breathable and compressible materials. A compressed thickness of the isolation component 4 is not less than a thickness of the first bonding member 3 to prevent the first bonding member 3 from spreading into the first gap 5, at the same time, it can ensure the bonding firmness between the battery cell 1 and the case assembly 2.

Figure 9:
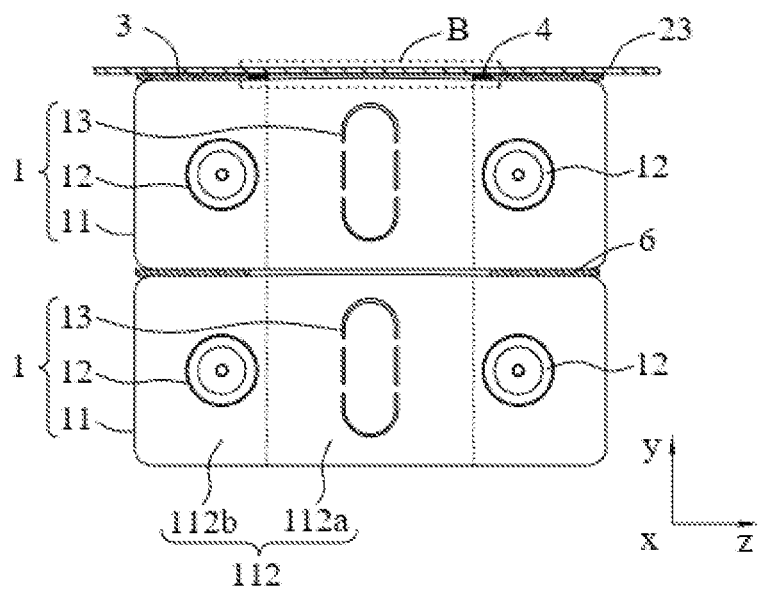
FIG. 9 shows a front view of some components of a battery provided by some embodiments of the present disclosure.
Figure 10:
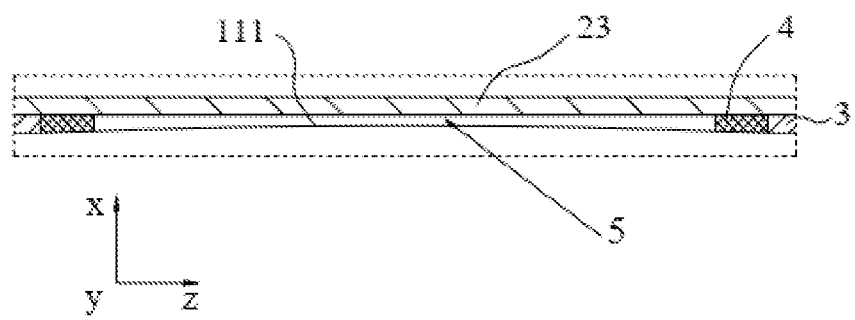
FIG. 10 shows an enlarged view at B place in FIG. 9.

As shown in FIG. 9 and FIG. 10, after the battery cell 1 is assembled in the case assembly 2, the first bonding member 3 bonds the battery cell 1 and the first portion into a whole, and the isolation component 4 compresses and separates the first bonding member 3 and the first gap 5. As the battery cell 1 is repeatedly charged and discharged, the battery cell 1 is expanded and deformed, and the first surface 111 of the battery cell 1 expands toward the first portion in the first direction X, so that the first gap 5 is compressed. The first gap 5 isolates the first surface 111 from the first portion, so that it can avoid the expansion and deformation of the first portion caused by the first surface 111 expanding and squeezing the first portion, thereby improving the service life and safety of the battery 10.

As shown in FIG. 2 to FIG. 9, in some embodiments, the plurality of battery cells 1 of the battery 10 are arranged in at least two layers in the first direction X. The battery further includes a second bonding member 6, and the second bonding member 6 is filled between the adjacent battery cells. A second gap 7 is formed between the adjacent battery cells 1, and the second gap 7 is configured to release the expansion stress of the battery cells 1 when the battery cells 1 expand.

In some embodiments, the second bonding member 6 adopts a double-sided tape, and two bonding surfaces of the double-sided tape are respectively bonded to the first surfaces 111 of the two adjacent battery cells 1. Of course, in some other implementations, the second bonding member 6 can also be made of the same material as the first bonding member 3, and the isolation component 4 can also be arranged between two adjacent battery cells 1 to isolate the second bonding member 6 from the second gap 7.

The second gap 7 directly faces to the central region of the first surface 111, the shape and structure of the second gap 7 are not restricted, the shape of the second gap 7 can be the circle, the rectangle or the triangle, and the second gap 7 may be of a closed structure or may have an opening. The second gap 7 can release the expansion stress of the battery cells 1 along the two first surfaces 111, so that the battery cells 1 can be deformed uniformly, and the life and safety of the battery cells 1 can be improved.

Figure 11:
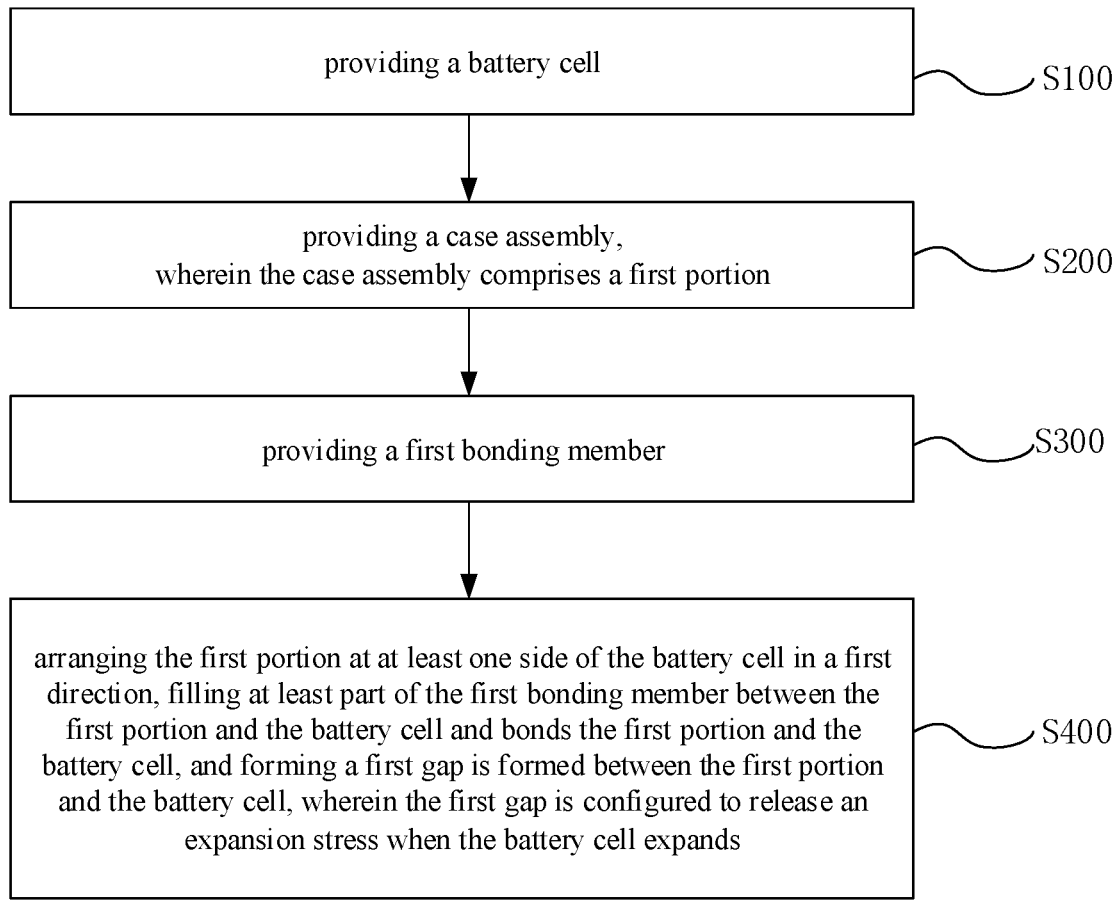
FIG. 11 shows a flow chart of a method for manufacturing a battery provided by some embodiments of the present disclosure.

FIG. 11 shows a flow chart of a method for manufacturing a battery provided by some embodiments of the present disclosure. As shown in FIG. 11, the flow chart of the method for manufacturing the battery provided by the embodiment of the present disclosure includes:

S100: providing the case assembly 2, in which the case assembly 2 includes a first portion;

S200: providing a first bonding member 3;

S300: arranging the first portion at least one side of the battery cell 1 in a first direction X, filling at least part of the first bonding member 3 between the first portion and the battery cell 1 and bonds the first portion and the battery cell 1, and forming a first gap 5 is formed between the first portion and the battery cell 1, in which the first gap 5 is configured to release an expansion stress when the battery cell 1 expands.

It should be noted that, for the related structure of the battery 10 manufactured by the above-mentioned method for manufacturing the battery, the battery 10 provided by the above-mentioned embodiments can be referred to.

When assembling the battery based on the above-mentioned method for manufacturing the battery, it is not necessary to perform the above-mentioned steps in sequence; in other words, the steps may be performed in the order mentioned in the embodiments, or the steps may be performed in an order different from that mentioned in the embodiments, or several steps may be performed simultaneously.

Figure 12:
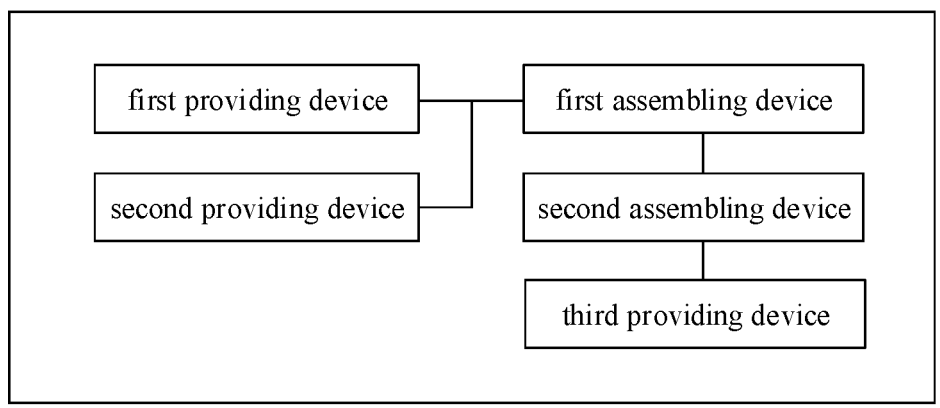
FIG. 12 is a schematic block view of an apparatus of manufacturing a battery provided by some embodiments of the present disclosure.

FIG. 12 is a schematic block view of an apparatus of manufacturing a battery provided by some embodiments of the present disclosure. As shown in FIG. 12, an apparatus of manufacturing the battery 10 includes a first providing device, configured to provide the battery cell 1;

a second providing device, configured to provide the case assembly 2, in which the case assembly 2 includes the first portion;

a first assembling device, configured to arrange the first portion at at least one side of the battery cell 1 in the first direction X;

a third providing device, configured to provide the first bonding member 3;

a second assembling device, configured to fill at least part of the first bonding member 3 between the first portion and the battery cell 1 and bond the first portion and the battery cell 1, in which the first gap 5 is formed between the first portion and the battery cell 1, the first gap 5 is configured to release the expansion stress when the battery cell 1 expands.

For the relevant structure of the battery manufactured by the above-mentioned apparatus of manufacturing the battery, the battery provided by the above-mentioned embodiments can be referred to.

It should be noted that the embodiments in the present disclosure and the features in the embodiments may be combined with one another without conflict.

Finally, it should be noted that above embodiments are only in order to illustrate the technical solution of the present disclosure, rather than restrict the technical solution. Although the present disclosure has been described in detail with reference to the above embodiments, those of ordinary skill in the art should understand that it is still possible to modify the technical solutions described in the above embodiments, or equivalently replace some technical features of the above embodiments, but these modifications or replacements do not make the essence of the corresponding technical solutions deviate from the gist and scope of the technical solutions of the embodiments of the present disclosure.

The invention claimed is:

1. A battery comprising:
a battery cell;
a case assembly, configured to accommodate the battery cell and including a first portion, wherein the first portion is arranged at at least one side of the battery cell in a first direction;
a first bonding member, wherein at least part of the first bonding member is filled between the first portion and the battery cell and bonds the first portion and the battery cell; and
an isolation component arranged between the first portion and the battery cell,
wherein a first gap is formed between the first portion and the battery cell, and the first gap is configured to release an expansion stress when the battery cell expands,
the isolation component surrounds a part of the first gap and separates the first bonding member from the first gap, the first gap has an opening not surrounded by the isolation component, and the opening is configured to discharge a gas in the first gap when the battery cell expands.

2. The battery according to claim 1, wherein the battery cell includes two first surfaces arranged to be opposite to each other in the first direction;
the first bonding member is bonded to one of the two first surfaces, and the first gap corresponds to a central region of the first surface.

3. The battery according to claim 2, wherein the first bonding member is arranged around the first gap.

4. The battery according to claim 2, wherein each one of the two first surfaces is a surface with a largest area of the battery cell.

5. The battery according to claim 2, wherein at least one side of the first gap extends to an edge of the first surface.

6. The battery according to claim 2, wherein the first surface comprises a first region and a second region, the first bonding member is bonded to the first region, and the first gap is formed between the second region and the first portion.

7. The battery according to claim 6, wherein a ratio of an area of the second region to a total area of the first surface is between 6% and 45%.

8. The battery according to claim 6, wherein
a dimension of the first surface in a second direction is L1, and a dimension of the second region in a third direction is X1, $1/4 \leq X1/L1 < 2/3$; and
a dimension of the first surface in the second direction is L2, and a dimension of the second region in a third direction is X2, $1/4 \leq X2/L2 \leq 2/3$; and, wherein
the second direction and the third direction are perpendicular to each other and both are parallel to the first surface.

9. The battery according to claim 6, wherein the second region is a central region of the first surface and is directly facing the first gap and, and the first region is a peripheral region of the first surface and communicates with the second region, at least one side of the second region extends to an edge of the first surface, and the opening of the first gap is formed by the second region with the first portion and the first bonding member.

10. The battery according to claim 2, wherein the battery cell further comprises:
two second surfaces arranged to be opposite to each other in a horizontal direction perpendicular to the first direction, wherein the second surfaces are connected to the first surface;
a pressure relief mechanism, arranged on one of the two second surfaces, wherein the opening of the first gap faces the pressure relief mechanism, and the pressure relief mechanism is configured to relieve an internal pressure of the battery cell when the internal pressure reaches to a threshold value.

11. The battery according to claim 1, wherein the battery comprises a plurality of battery cells, and the plurality of battery cells are arranged in at least two layers in the first direction;
each one of the plurality of battery cells includes two first surfaces arranged to be opposite to each other in the first direction;
the battery further comprises a second bonding member, and the second bonding member is filled between two adjacent battery cells of the plurality of battery cells and bonded to one of the two first surfaces of each one of the two adjacent battery cells, and the first gap corresponds to a central region of the first surfaces; and
a second gap is formed between the adjacent battery cells, and the second gap is directly facing a central region of the first surfaces and configured to release the expansion stress of the battery cells along the first surfaces when the battery cells expand.

12. The battery according to claim 11, wherein the second gap has an opening.

13. The battery according to claim 1, wherein the case assembly comprises a lower case body, an upper case cover, and at least one fixing member, the fixing member is mounted on the lower case body, the lower case body and the upper case cover are arranged in the first direction and connected to each other, and the battery cell and the fixing member are arranged in an accommodating space surrounded by the lower case body and the upper case cover,
the battery cell is sandwiched and mounted between the fixing member and the lower case body, and a part of the lower case body or the fixing member arranged at the side of the battery cell in the first direction is the first portion.

14. The battery according to claim 13, wherein the at least one fixing member comprises two fixing members, the battery cell is sandwiched and mounted between the two fixing members, and a part of each one of the two fixing members arranged at the side of the battery cell in the first direction is the first portion.

15. The battery according to claim 1, wherein the battery cell comprises an electrode assembly, and the electrode assembly comprises a first electrode sheet and a second electrode sheet;
the first electrode sheet and the second electrode sheet are wound around a winding axis and form a winding structure, and the winding axis is parallel to the first portion;
the electrode assembly comprises a plurality of first electrode sheets and a plurality of second electrode sheets, and the plurality of first electrode sheets and the plurality of second electrode sheets are alternately stacked in the first direction; or
the electrode assembly comprises a plurality of second electrode sheets, the first electrode sheet comprises a plurality of layer-stacking sections arranged to be stacked and a plurality of bending sections, each of the bending sections is connected to two adjacent layer-stacking sections, the plurality of layer-stacking sections and the plurality of second electrode sheets are alternately stacked in the first direction, and the first direction is perpendicular to the first portion.

16. An electricity-consuming device, comprising the battery according to claim 1, the battery is configured to provide electrical energy.

17. The battery according to claim 1, wherein the isolation component is made of a foam or a rubber, and a compressed thickness of the isolation component is not less than a thickness of the first bonding member.

18. A method for manufacturing a battery, comprising providing a battery cell;
providing a case assembly, wherein the case assembly comprises a first portion;
providing a first bonding member;
providing an isolation component;
arranging the first portion at at least one side of the battery cell in a first direction, filling at least part of the first bonding member between the first portion and the battery cell and bonding the first portion and the battery cell, arranging the isolation component between the first portion and the battery cell, and forming a first gap is formed between the first portion and the battery cell, wherein the first gap is configured to release an expansion stress when the battery cell expands, the isolation component surrounds a part of the first gap and separates the first bonding member from the first gap, the first gap has an opening not surrounded by the isolation component, and the opening is configured to discharge a gas in the first gap when the battery cell expands.

* * * * *